(12) United States Patent
Hahn et al.

(10) Patent No.: US 10,584,236 B2
(45) Date of Patent: Mar. 10, 2020

(54) RUBBER COMPOSITION CONTAINING SPECIALIZED STYRENE/BUTADIENE ELASTOMER AND PRECIPITATED SILICA REINFORCEMENT AND TIRE WITH COMPONENT

(71) Applicant: The Goodyear Tire & Rubber Company, Akron, OH (US)

(72) Inventors: Bruce Raymond Hahn, Hudson, OH (US); George Jim Papakonstantopoulos, Medina, OH (US); Michael Lester Kerns, Medina, OH (US); Gamil Gamal Attareb, Cuyahoga Falls, OH (US); Karen Karas Burke, Copley, OH (US); Tang Hong Wong, Hudson, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 52 days.

(21) Appl. No.: 16/001,236

(22) Filed: Jun. 6, 2018

(65) Prior Publication Data

US 2018/0362738 A1    Dec. 20, 2018

Related U.S. Application Data

(60) Provisional application No. 62/521,709, filed on Jun. 19, 2017.

(51) Int. Cl.
| | |
|---|---|
| C08L 81/04 | (2006.01) |
| C08L 9/06 | (2006.01) |
| C08K 3/36 | (2006.01) |
| C08K 3/04 | (2006.01) |
| C08K 5/548 | (2006.01) |
| B60C 1/00 | (2006.01) |
| C08K 9/06 | (2006.01) |

(52) U.S. Cl.
CPC .............. *C08L 9/06* (2013.01); *B60C 1/0016* (2013.01); *C08L 81/04* (2013.01); *C08K 3/04* (2013.01); *C08K 3/36* (2013.01); *C08K 5/548* (2013.01); *C08K 9/06* (2013.01); *C08L 2207/324* (2013.01)

(58) Field of Classification Search
CPC .. C08L 81/04; C08L 9/06; C08K 3/36; C08K 3/04; C08K 5/548
USPC ........................................................ 524/492
See application file for complete search history.

(56) References Cited

U.S. PATENT DOCUMENTS

| | | | |
|---|---|---|---|
| 9,650,503 B2 | 5/2017 | Sandstrom et al. | |
| 2007/0037931 A1* | 2/2007 | Chung | ................... A01N 25/10 525/192 |

FOREIGN PATENT DOCUMENTS

| | | |
|---|---|---|
| JP | 2005126604 | 5/2005 |
| JP | 2006152200 | 6/2006 |
| JP | 2014185343 | 10/2014 |

OTHER PUBLICATIONS

EPO search report completed Nov. 5, 2018 and received by Applicant dated Nov. 15, 2018.

* cited by examiner

*Primary Examiner* — Deve V Hall
(74) *Attorney, Agent, or Firm* — John D. DeLong; Henry C. Young

(57) ABSTRACT

The invention relates to a rubber compositions containing a specialized styrene/butadiene elastomer with molecular weight profile containing a limited low molecular weight content and precipitated silica reinforcement and tire with at least one component, such as for example a tread, comprised of such rubber composition.

17 Claims, No Drawings

RUBBER COMPOSITION CONTAINING SPECIALIZED STYRENE/BUTADIENE ELASTOMER AND PRECIPITATED SILICA REINFORCEMENT AND TIRE WITH COMPONENT

FIELD OF THE INVENTION

The invention relates to a rubber composition containing a specialized styrene/butadiene elastomer with molecular weight profile containing a limited low molecular weight content and precipitated silica reinforcement and tire with at least one component, such as for example a tread, comprised of such rubber composition.

BACKGROUND OF THE INVENTION

Tires are sometimes provided with one or more components of a rubber composition comprised of at least one conjugated diene-based elastomer which includes a styrene/butadiene elastomer for which the rubber composition contains reinforcing filler comprised of precipitated silica.

It is desired to evaluate the use of a specialized styrene/butadiene elastomer having a molecular weight profile restricted to having a low molecular weight content limited to a maximum of six percent of weight average molecular weight (Mw) of up to 150,000.

While a mechanism might not be fully understood, it is theorized that the presence of a low molecular weight content in a styrene/butadiene elastomer can promote absorbing greater energy within the elastomer. Such energy absorption may thereby contribute to promoting a higher hysteresis of the cured rubber composition, as may be evidenced by one or more of its rebound and tangent delta physical properties, and thereby promote higher heat generation within the rubber composition, or tire component, during tire service. It is envisioned that a lower content of low molecular weight portion of the elastomer might beneficially promote less internal heat generation within the rubber composition during its dynamic use and an associated beneficial reduction in the rubber composition's hysteresis.

Therefore, such evaluation is to be undertaken.

In the description of this invention, terms such as "compounded rubber", "rubber compound" and "compound", if used herein, refer to rubber compositions containing elastomers blended with various ingredients, including curatives such as sulfur and cure accelerators. The terms "elastomer" and "rubber" may be used herein interchangeably unless otherwise indicated. It is believed that such terms are well known to those having skill in such art. The molecular weight of an elastomer may be determined, for example, by Gel Permeation Chromatography as would be understood as being well known by those having skill in such art.

Disclosure and Practice of the Invention

In accordance with this invention, a pneumatic rubber tire is provided having a component of a rubber composition containing, based on parts by weight per 100 parts by weight of the rubber (phr), (A) conjugated diene-based elastomers comprised of:
(1) about 40 to about 90, alternately about 60 to about 80 phr of a specialized styrene/butadiene elastomer having a molecular weight profile comprised of a weight average molecular weight (Mw) in a range of from about 500,000 to about 800,000 with a low molecular weight content limited to a maximum of six, alternately about 5.5, percent of said styrene/butadiene elastomer having a number average molecular weight (Mw) of up to 150,000, and
(2) about 60 to about 10, alternately about 40 to about 20, phr of at least one additional conjugated diene-based elastomer, (B) about 40 to about 150, alternately about 40 to about 120, phr of reinforcing filler comprised of a combination of rubber reinforcing carbon black and precipitated silica (e.g. containing from about 0.1 to about 100 weight percent of said precipitated silica), wherein said precipitated silica is provided together with a coupling agent for said precipitated silica having a moiety reactive or interactive with hydroxyl groups (e.g. silanol groups) on said precipitated silica and another different moiety reactive or interactive with said diene-based elastomers.

In one embodiment, said coupling agent is comprised of an alkoxyorganomercaptosilane or an bis(3-triethoxysilylpropyl) polysulfide having an average of from about 2 to about 4 connecting sulfur atoms in its polysulfidic bridge.

The bis(3-triethoxysilylpropyl) polysulfide may have an average of from about 2 to about 2.6 or about 3.4 to about 3.8, connecting sulfur atoms in its polysulfidic bridge.

In one embodiment, said precipitated silica and coupling agent are provided as a composite of said precipitated silica pre-treated (pre-hydrophobated) with said coupling agent prior to addition thereof to the rubber composition. In such embodiment, said coupling agent may desirably be, for example, said alkoxyorganomercaptosilane.

In one embodiment, said precipitated silica and coupling agent are provided with said rubber composition to thereby provide in situ treatment of (reaction with) said precipitated silica within said rubber composition (instead of being pre-reacted to form a composite before addition to the rubber composition). In such embodiment for such in situ treated precipitated silica, said coupling agent may desirably be, for example, said bis (3-triethoxysilylpropyl) polysulfide.

In further accordance with this invention said rubber composition is provided as a sulfur cured rubber composition.

In one embodiment, the said specialized styrene/butadiene elastomer has a heterogeneity index (Mw/Mn) in a range of from about 1.5/1 to about 1.8/1.

The molecular weight characterization of the specialized styrene/butadiene elastomer (ASTM D4001-13) may be carried out using an Agilent 1260 GPC (gel permeation chromatography) system equipped with an Agilent 1260 VWD ultraviolet detector, and Wyatt Technology Light Scattering, Viscosity, and Refractive index detectors with tetrahydrofuran as the mobile phase.

In practice, such tire component may be, for example, and not intended to be limiting, a tire tread. The tread component of the tire is a circumferential tire tread intended to be capable of being ground-contacting.

Therefore, in further accordance with this invention, a tire is provided having a circumferential tread comprised of said rubber composition.

In practice, suitable rubber reinforcing carbon blacks may be found, for example, in *The Vanderbilt Rubber Handbook*, (1990), 13th edition, Pages 416 through 419.

In one embodiment, said additional conjugated diene-based elastomers may be, for example, elastomers comprised of at least one of isoprene and 1,3-butadiene and of styrene and at least one of isoprene and 1,3-butadiene.

Representative of such additional conjugated diene-based elastomers may be, for example and not intended to be limiting, at least one of cis 1,4-polybutadiene, cis 1,4-polyisoprene and styrene/butadiene elastomers other than, or in addition to, said specialized styrene/butadiene elastomer having said limited molecular distribution (molecular weight profile). Said additional elastomers, including said specialized styrene/butadiene elastomer, are exclusive of elastomers containing functional groups reactive with hydroxyl groups on said precipitated silica.

The aforesaid specialized or additional styrene/butadiene elastomer may, if desired, be tin or silicon coupled, more desirably tin coupled, to form a star-branched elastomer whereby its molecular weight is significantly increased.

In practice, specialized styrene/butadiene elastomer with molecular weight profile comprised of the restricted low molecular weight content has a bound styrene content in a range of from about 10 to about 40 percent. It may have a vinyl 1,2-content in a range of from about 10 to about 60 percent.

For tin coupling of any of the styrene/butadiene elastomers, various organo tin compounds, may be used. Representative of such compounds are, for example, alkyl tin trichloride, dialkyl tin dichloride, yielding variants of a tin coupled styrene/butadiene copolymer elastomer.

The precipitated silica reinforcing filler is a synthetic amorphous silica such as, for example, a precipitated silica obtained by the acidification of a soluble silica silicate (e.g., sodium silicate or a co-precipitation of a silicate and an aluminate). Such precipitated silicas are, in general, well known to those having skill in such art. Representative of precipitated silica for use in this invention includes, for example, and not intended to be limitative, Zeosil 1165MP and 200MP from Solvay, Hi-Sil 135G-D and 233 from PPG Industries, EZ160G-D from PPG Industries, Zeopol 8755LS from Huber, Ultrasil VN 2 GR from Evonik. Representative of pre-treated (pre-hydrophobated) precipitated silica is, for example and not intended to be limitative, Agilon 400™ from PPG Industries.

It is readily understood by those having skill in the art that the rubber compositions of the tread would be compounded with conventional compounding ingredients including the aforesaid reinforcing fillers such as carbon black and precipitated silica, as hereinbefore described, as well as antidegradant(s), processing oils, fatty acid comprised of, for example, stearic, oleic and palmitic acids and zinc oxide.

Processing aids may be used, for example, waxes such as microcrystalline and paraffinic waxes, in a range, for example, of about 1 to 5 phr or about 1 to about 3 phr; and resins, usually as tackifiers, such as, for example, synthetic hydrocarbon and natural resins in a range of, for example, about 1 to 5 phr or about 1 to about 3 phr. A curative might be classified as sulfur together with one or more sulfur cure accelerator(s). In a sulfur and accelerator(s) curative, the amount of sulfur used may be, for example, from about 0.5 to about 5 phr, more usually in a range of about 0.5 to about 3 phr; and the accelerator(s), often of the sulfenamide type, is (are) used in a range of about 0.5 to about 5 phr, often in a range of about 1 to about 2 phr. The ingredients, including the elastomers but exclusive of sulfur and accelerator curatives, are normally first mixed together in a series of at least two sequential mixing stages, although sometimes one mixing stage might be used, to a temperature in a range of, for example, about 145° C. to about 185° C., and such mixing stages are typically referred to as non-productive mixing stages. Thereafter, the sulfur and accelerators, and possibly one or more retarders and possibly one or more antidegradants, are mixed therewith to a temperature of, for example, about 90° C. to about 120° C. and is typically referred as a productive mix stage. Such mixing procedure is well known to those having skill in such art.

After mixing, the compounded rubber can be fabricated such as, for example, by extrusion through a suitable die to form a tire tread. The tire tread is then typically built onto a sulfur curable tire carcass and the assembly thereof cured in a suitable mold under conditions of elevated temperature and pressure by methods well-known to those having skill in such art.

The invention may be better understood by reference to the following example in which the parts and percentages are by weight unless otherwise indicated.

EXAMPLE I

For In Situ Reacted Precipitated Silica and Coupling Agent

Rubber compositions were prepared to evaluate various styrene/butadiene elastomers for use with precipitated silica. The precipitated silica and coupling agent are reacted together in situ within the rubber composition.

Control rubber Sample A contained a styrene/butadiene rubber (A1) together with precipitated silica.

Control rubber Sample B contained a styrene/butadiene rubber (A2) together with precipitated silica.

Experimental rubber Samples C and D individually contained a specialized styrene/butadiene rubber having a molecular weight profile comprised of an average molecular weights (Mw) of about 683,000 (Experimental styrene/butadiene rubber B1) and about 702,000 (Experimental styrene/butadiene rubber B2), respectively, with each of said Experimental styrene/butadiene rubbers having weight average molecular weight (Mw) of up to 150,000 being less than about six percent of said rubbers, together with precipitated silica.

The basic formulation is illustrated in the following Table 1 which is presented in terms of parts per 100 parts by weight of rubber (phr).

As previously indicated, the rubber compositions may be prepared by mixing the elastomers(s) without sulfur and sulfur cure accelerators in a first non-productive mixing stage (NP-1) in an internal rubber mixer for about 4 minutes to a temperature of about 160° C. If desired, the rubber mixture may then be mixed in a second non-productive mixing stage (NP-2) in an internal rubber mixer for about 4 minutes to a temperature of about 160° C. while adding additional ingredients if desired. The resulting rubber mixture may then be mixed in a productive mixing stage (PR) in an internal rubber mixer with sulfur and sulfur cure accelerator(s) for about 2 minutes to a temperature of about 110° C. The rubber composition may be sheeted out and cooled to below 50° C. between each of the non-productive mixing steps and prior to the productive mixing step. Such rubber mixing procedure is well known to those having skill in such art.

TABLE 1

| | Parts (phr) |
|---|---|
| Non-Productive Mixing Step (NP) - Mixed to 160° C. | |
| Control styrene/butadiene rubber A1[1] | 0 and 70 |
| Control styrene/butadiene rubber A2[2] | 0 and 70 |
| Experimental (specialized) styrene/butadiene rubber B1[3] | 0 and 70 |
| Experimental (specialized) styrene/butadiene rubber B2[4] | 0 and 70 |
| Cis 1,4-polybutadiene rubber[5] | 30 |
| Precipitated silica[6] | 80 |
| Silica coupling agent[7] | 6.4 |
| Fatty acid[8] | 3 |
| Total/combined rubber processing oil, petroleum oil based, in the elastomers | 26.25 |
| Zinc oxide | 2 |
| Carbon black (N330)[9] | 5 |

TABLE 1-continued

| | Parts (phr) |
|---|---|
| Wax, microcrystalline and/or paraffinic | 1.5 |
| Antioxidant(s) | 3 |
| Productive Mixing Step (PR) - Mixed to 110° C. | |
| Sulfur | 1.4 |
| Accelerator(s)[10] | 4 |

[1]Control organic solvent solution polymerization derived styrene/butadiene rubber (S-SBR-A1) as Solflex 16S42 from The Goodyear Tire and Rubber Company having a bound styrene content of about 16 percent and vinyl-1,2-content of about 42 percent, a weight average molecular weight (Mw) of about 437,000 with about 26 percent thereof having an average Mw of less than about 150,000 and a heterogeneity (polydispersity) index, (Mw/Mn), of about 2.3/1

[2]Control organic solvent solution polymerization derived styrene/butadiene (S-SBR-A2) as Solflex 30H41 from The Goodyear Tire and Rubber Company having a bound styrene content of about 30 percent and vinyl content of about 41 percent, a weight average molecular weight (Mw) of about 650,000 with about 7.5 percent thereof having a weight average Mw of less than about 150,000 and a heterogeneity (polydispersity) index (Mw/Mn) of about 1.81/1. The elastomer was petroleum oil extended with about 37.5 parts by weight oil per 100 parts by weight of the elastomer and is reported in the Table in parts by weight of the elastomer.

[3]Experimental organic solvent solution polymerization prepared styrene/butadiene rubber (S-SBR-B1) having a bound styrene of about 21 percent and vinyl content of about 50 percent and a molecular weight profile comprised of an weight average molecular weight (Mw) of about 683,000 with about 5.1 percent thereof having a weight average Mw of up to about 150,000 and a heterogeneity (polydispersity) index (Mw/Mn) of about 1.67/1. The elastomer was petroleum oil extended with about 20 parts by weight oil per 100 parts by weight of the elastomer and is reported in the Table in parts by weight of the elastomer.

[4]Experimental organic solvent polymerization prepared styrene/butadiene rubber (S-SBR-B2) having a bound styrene of about 30 percent and vinyl content of about 41 percent, and a molecular weight profile comprised of a weight average molecular weight (Mw) of about 702,000 with about 4.8 percent thereof having a weight average Mw of up to about 150,000 and a heterogeneity (polydispersity) index (Mw/Mn) of about 1.65/1. The elastomer was petroleum oil extended with about 20 parts by weight oil per 100 parts by weight of the elastomer and is reported in the Table in parts by weight of the elastomer.

[5]Cis-1,4-polybutadiene rubber as BUD1207 from The Goodyear Tire and Rubber Company having a Tg of about −105° C.

[6]Precipitated silica as Zeosil 1165MP ™ from Solvay

[7]Silica coupling agent as Si266 ™ from Evonik as bis(3-triethoxysilylpropyl) polysulfide having an average of from 2 to about 2.6 connecting sulfur atoms in its polysulfidic bridge.

[8]Fatty acid comprised of stearic, palmitic and oleic acids

[9]Rubber reinforcing carbon black as N330, an ASTM characterization

[10]Sulphenamide and diphenyl guanidine sulfur cure accelerators

The following Table 2 represents the uncured and cure behavior and various physical properties of the rubber compositions. Test samples were cured for about 14 minutes at about 160° C.

TABLE 2

| | Samples | | | |
|---|---|---|---|---|
| | Control | | Experimental | |
| | A | B | C | D |
| Control styrene/butadiene rubber A1 | 70 | 0 | 0 | 0 |
| Control styrene/butadiene rubber A2 | 0 | 70 | 0 | 0 |
| Experimental styrene/butadiene rubber B1 | 0 | 0 | 70 | 0 |
| Experimental styrene/butadiene rubber B2 | 0 | 0 | 0 | 70 |
| Cis 1,4-polybutadiene rubber | 30 | 30 | 30 | 30 |
| Precipitated silica | 80 | 80 | 80 | 80 |
| Properties | | | | |
| Rubber processing indication (RPA[1]), uncured storage modulus G', 15% strain 0.83 Hertz, 60° C. (kPa) | 207 | 315 | 347 | 353 |
| Rubber stiffness indication (RPA[1]), cured storage modulus G' at 10% strain, 1 Hertz, 60° C., kPa (higher is better) | 2079 | 2202 | 2127 | 2149 |
| Rubber Hysteresis Indication | | | | |
| Tan delta at 10% strain, 1 Hertz, 60° C. (lower is better) | 0.176 | 0.161 | 0.156 | 0.155 |
| Rebound (Zwick), 100° C., % (higher is better) | 55 | 59 | 60 | 61 |

TABLE 2-continued

|  | Samples | | | |
| --- | --- | --- | --- | --- |
|  | Control | | Experimental | |
|  | A | B | C | D |
| MDR test; 120 minutes at 150° C. | | | | |
| Delta torque (dN-m) | 18 | 18.8 | 18.3 | 17.5 |
| T90 (minutes) | 19.2 | 18.2 | 18.8 | 18.2 |
| Stress-strain Properties | | | | |
| Tensile strength (MPa) | 18.2 | 19.9 | 18.3 | 18.2 |
| Elongation at break (%) | 628 | 614 | 574 | 561 |
| 300% modulus, (MPa) | 6.8 | 7.5 | 7.4 | 7.6 |

[1]Rubber Process Analyzer

From Table 2 it is observed that:

(A) Uncured Rubber Sample Processing

For Experimental rubber Samples C and D containing the specialized styrene/butadiene rubbers with their molecular weight profiles, the uncured G' storage modulus values of 347 and 353 KPa, respectively, was greater than the G' values of 207 and 315 KPa, respectively, for Control rubber Samples A and B. This is an indication that the inclusion of the specialized styrene/butadiene rubbers in the rubber Samples C and D with their molecular weight profiles containing the reduced low molecular weight contents increased the energy needed for processing the rubber Samples.

While the discovered result is not entirely understood, it is envisioned that the reduction in the lower molecular weight content of the styrene/butadiene elastomer increased the content of the higher molecular weight molecules of the elastomer profiles so that their polymer chain entanglements within the elastomers becomes a greater factor and promotes a higher storage modulus G' for the uncured elastomers and rubber compositions.

(B) Cured Rubber Sample Stiffness

For cured Experimental rubber Samples C and D containing the specialized styrene/butadiene rubbers with their molecular weight profiles, the cured G' storage modulus values of 2127 and 2149 KPa, respectively, were similar to the G' values of 2079 and 2202 KPa, respectively, for Control rubber Samples A and B. This is an indication that the inclusion of the specialized styrene/butadiene rubbers with their molecular weight profiles containing the reduced low molecular weight contents did not significantly change the energy needed for dynamic deformation of the cured the rubber Samples.

While the discovered result is not entirely understood, it is envisioned that although the reduction in the lower molecular weight contents of the styrene/butadiene elastomers increased the content of their higher molecular weight molecules of the elastomer profiles, their polymer chain entanglements within the elastomers were apparently not a large factor for affecting the storage modulus G' for the cured elastomers and rubber compositions.

(C) Cured Rubber Indicated Hysteresis

For cured Experimental rubber Samples C and D containing the specialized styrene/butadiene rubbers with their molecular weight profiles, their tan delta physical properties of 0.156 and 0.155, respectively, were significant lower than the tan delta physical properties of 0.176 and 0.161, respectively, for Control rubber Samples A and B. This is an indication that the inclusion of the specialized styrene/butadiene rubber with their molecular weight profiles in the rubber Samples C and D resulted in a significant discovery of an indication of reduced indicated hysteresis and thereby beneficially reduced the predictive internal heat generation within the rubber compositions, and associated rubber temperature increase of such rubber composition when used as a rubber composition for a tire component such as, for example a tire tread during the operational service of the tire.

It is also seen for cured Experimental rubber Samples C and D containing the specialized styrene/butadiene rubbers with their molecular weight profiles, their hot rebound physical properties of 60 and 61 percent, respectively, were higher than corresponding hot rebound values of 55 and 59, respectively, for Control rubber Samples A and B. This is a significant discovery of an indication that the inclusion of the specialized styrene/butadiene rubbers with their molecular weight profiles in the rubber Samples C and D beneficially reduced their indicated hysteresis to thereby reduce the predictive internal heat generation within the rubber compositions, and associated rubber temperature increase of such rubber composition when used as a rubber composition for a tire component such as, for example a tire tread during the operational service of the tire to thereby increase the durability of the tire as well as a beneficial predictive reduction in the tire's predictive rolling resistance and associated decrease in an associated vehicle's fuel consumption.

While the discovered results are not entirely understood, it is envisioned that the reduction in the lower molecular weight contents of the styrene/butadiene elastomers increased the content of the higher molecular weight molecules of their elastomer profiles so that their polymer chain entanglements within the elastomers becomes a greater factor and promotes a greater energy absorption and therefore a beneficial reduction in internal heat generation within the rubber compositions during their dynamic flexing resulting in lower Tan Delta values and higher hot rebound values of the cured rubber compositions with an associated beneficial reduction in indicated hysteresis of the rubber compositions.

EXAMPLE II

Use of Pre-treated Precipitated Silica

Rubber compositions were prepared to evaluate various styrene/butadiene elastomers for use with precipitated silica. The precipitated silica is provided as a composite comprised of precipitated silica pre-treated (pre-hydrophobated) with silica coupling agent prior to addition thereof to the rubber composition.

Control rubber Sample E contained a styrene/butadiene rubber (A1) together with a pre-hydrophobated precipitated silica.

Control rubber Sample F contained a styrene/butadiene rubber (A2) together with a pre-hydrophobated precipitated silica.

Experimental rubber Samples G and H individually contained a specialized styrene/butadiene rubber having a molecular weight profile comprised of weight average molecular weights (Mw) of about 683,000 (Experimental styrene/butadiene rubber B1) and about 702,000 (Experimental styrene/butadiene rubber B2), respectively, with each of said Experimental styrene/butadiene rubbers having a number average molecular weight (Mw) of up to 150,000 being less than about six percent of said rubbers, together with a pre-hydrophobated precipitated silica.

The basic formulation is illustrated in the following Table 3 which is presented in terms of parts per 100 parts by weight of rubber (phr).

As previously indicated, the rubber compositions may be prepared by mixing the elastomers(s) without sulfur and sulfur cure accelerators in a first non-productive mixing stage (NP-1) in an internal rubber mixer for about 4 minutes to a temperature of about 160° C. If desired, the rubber mixture may then be mixed in a second non-productive mixing stage (NP-2) in an internal rubber mixer for about 4 minutes to a temperature of about 160° C. while adding additional ingredients if desired. The resulting rubber mixture may then be mixed in a productive mixing stage (PR) in an internal rubber mixer with sulfur and sulfur cure accelerator(s) for about 2 minutes to a temperature of about 110° C. The rubber composition may be sheeted out and cooled to below 50° C. between each of the non-productive mixing steps and prior to the productive mixing step. Such rubber mixing procedure is well known to those having skill in such art.

TABLE 3

| | Parts (phr) |
|---|---|
| First Non-Productive Mixing Step (NP1) - Mixed to 160° C. | |
| Control styrene/butadiene rubber A1[1] | 0 and 70 |
| Control styrene/butadiene rubber A2[2] | 0 and 70 |
| Experimental (specialized) styrene/butadiene rubber B1[3] | 0 and 70 |
| Experimental (specialized) styrene/butadiene rubber B2[4] | 0 and 70 |
| Cis 1,4-polybutadiene rubber[5] | 30 |

TABLE 3-continued

| | Parts (phr) |
|---|---|
| Pre-hydrophobated precipitated silica[6] | 70 |
| Processing aid, fatty acid based | 3 |
| Fatty acid[7] | 2 |
| Total/combined rubber processing oil, petroleum oil based, in the elastomers | 26.25 |
| Second Non-Productive Mixing Step (NP2) - Mixed to 160° C. | |
| Zinc oxide | 1.8 |
| Carbon black (N330)[8] | 5 |
| Wax, microcrystalline and/or paraffinic | 3 |
| Antioxidant(s) | 3 |
| Productive Mixing Step (PR) - Mixed to 110° C. | |
| Sulfur | 1 |
| Accelerator(s)[9] | 2 |

[1]Control organic solvent solution polymerization derived styrene/butadiene rubber (S-SBR-A1) as Solflex 16S42 from The Goodyear Tire and Rubber Company having a bound styrene content of about 16 percent and vinyl-1,2-content of about 42 percent, a weight average molecular weight (Mw) of about 437,000 with about 26 percent thereof having a weight average Mw of less than about 150,000 and a heterogeneity (polydispersity) index (Mw/Mn) of about 2.3/1.

[2]Control organic solvent solution polymerization derived styrene/butadiene (S-SBR-A2) as Solflex 30H41 from The Goodyear Tire and Rubber Company having a bound styrene content of about 30 percent and vinyl content of about 41 percent, a weight average molecular weight (Mw) of about 650,000 with about 7.5 percent thereof having a weight average Mw of less than about 150,000 and a heterogeneity (polydispersity) index (Mw/Mn) of about 1.81/1. The elastomer was petroleum oil extended with about 37.5 parts by weight oil per 100 parts by weight of the elastomer and is reported in the Table in parts by weight of the elastomer

[3]Experimental organic solvent solution polymerization prepared styrene/butadiene rubber (S-SBR-B1) having a bound styrene of about 21 percent and vinyl content of about 50 percent, and a molecular weight profile comprised of an weight average molecular weight (Mw) of about 683,000 with about 5 percent thereof having a weight average Mw of up to about 150,000, and a heterogeneity (polydispersity) index, (Mw/Mn), of about 1.67/1. The elastomer was petroleum oil extended with about 20 parts by weight oil per 100 parts by weight of the elastomer and is reported in the Table in parts by weight of the elastomer.

[4]Experimental organic solvent polymerization prepared styrene/butadiene rubber (S-SBR-B2) having a bound styrene of about 30 percent and vinyl content of about 41 percent, and a molecular weight profile comprised of a weight average molecular weight (Mw) of about 702,000 with about 4.8 percent thereof having a weight average Mw of up to about 150,000, and a heterogeneity (polydispersity) index, (Mw/Mn), of about 1.65/1. The elastomer was petroleum oil extended with about 20 parts by weight oil per 100 parts by weight of the elastomer and is reported in the Table in parts by weight of the elastomer.

[5]Cis-1,4-polybutadiene rubber as BUD1207 from The Goodyear Tire and Rubber Company having a Tg of about −105° C.

[6]Prehydrophobated precipitated silica, understood to be a precipitated silica pre-reacted with an organoalkoxymercaptosilane, as Agilon 400 ™ from PPG

[7]Fatty acid comprised of stearic, palmitic and oleic acids

[8]Rubber reinforcing carbon black as N330, an ASTM characterization

[9]Sulphenamide and diphenyl guanidine sulfur cure accelerators

The following Table 4 represents the uncured and cure behavior and various physical properties of the rubber compositions. Test samples were cured for about 14 minutes at about 160° C.

TABLE 4

| | Samples | | | |
|---|---|---|---|---|
| | Control | | Experimental | |
| | E | F | G | H |
| Control styrene/butadiene rubber A1 | 70 | 0 | 0 | 0 |
| Control styrene/butadiene rubber A2 | 0 | 70 | 0 | 0 |
| Experimental styrene/butadiene rubber B1 | 0 | 0 | 70 | 0 |
| Experimental styrene/butadiene rubber B2 | 0 | 0 | 0 | 70 |
| Cis 1,4-polybutadiene rubber | 30 | 30 | 30 | 30 |
| Pre-hydrophobated silica | 70 | 70 | 70 | 70 |

TABLE 4-continued

|  | Samples | | | |
| --- | --- | --- | --- | --- |
|  | Control | | Experimental | |
|  | E | F | G | H |
| Properties | | | | |
| Rubber processing indication (RPA[1]), uncured storage modulus G', 15% strain 0.83 Hertz, 60° C. (kPa) | 151 | 217 | 270 | 240 |
| Rubber stiffness indication (RPA[1]), cured storage modulus G' at 10% strain, 1 Hertz, 60° C., kPa (higher is better) | 817 | 854 | 948 | 856 |
| Rubber hysteresis indication (RPA[1]) | | | | |
| Tan delta at 10% strain, 1 Hertz, 60° C. (lower is better) | 0.15 | 0.13 | 0.12 | 0.13 |
| Rebound (Zwick), 100° C., % (higher is better) | 63 | 68 | 70 | 69 |
| MDR test; 120 minutes at 150° C. | | | | |
| Delta torque (dN-m) | 6.6 | 6.2 | 6.7 | 6.2 |
| T90 (minutes) | 15 | 14 | 15 | 14 |
| Stress-strain Properties | | | | |
| Tensile strength (MPa) | 17 | 20 | 17 | 19 |
| Elongation at break (%) | 805 | 701 | 613 | 732 |
| 300% modulus, (MPa) | 3.4 | 4.8 | 5.1 | 3.9 |

[1]Rubber Process Analyzer

From Table 4 it is observed that:

(A) Uncured Rubber Sample Processing

For Experimental rubber Samples G and H containing the specialized styrene/butadiene rubbers with their molecular weight profiles, the uncured G' storage modulus values of 270 and 240 KPa, respectively, was greater than the G' values of 151 and 217 KPa, respectively, for Control rubber Samples E and F. This is an indication that the inclusion of the specialized styrene/butadiene rubbers in the rubber Samples E and F with their molecular weight profiles containing the reduced low molecular weight contents increased the energy needed for processing the rubber Samples.

While the discovered result is not entirely understood, it is envisioned that the reduction in the lower molecular weight content of the styrene/butadiene elastomer increased the content of the higher molecular weight molecules of the elastomer profiles so that their polymer chain entanglements within the elastomers becomes a greater factor and promotes a higher storage modulus G' for the uncured elastomers and rubber compositions.

(B) Cured Rubber Sample Stiffness

For cured Experimental rubber Samples G and H containing the specialized styrene/butadiene rubbers with their molecular weight profiles, the cured G' storage modulus values of 948 and 856 KPa, respectively, were significantly greater than the G' values of 817 and 854 KPa, respectively, for Control rubber Samples E and F. This is an indication that the inclusion of the specialized styrene/butadiene rubbers with their molecular weight profiles containing the reduced low molecular weight contents increased the energy needed for dynamic deformation of the cured the rubber Samples.

While the discovered result is not entirely understood, it is envisioned that the reduction in the lower molecular weight contents of the styrene/butadiene elastomers increased the content of their higher molecular weight molecules of the elastomer profiles so that their polymer chain entanglements within the elastomers becomes a greater factor and promotes a higher storage modulus G' for the cured elastomers and rubber compositions.

(C) Cured Rubber Indicated Hysteresis

For cured Experimental rubber Samples G and H containing the specialized styrene/butadiene rubbers with their molecular weight profiles, their tan delta physical properties of 0.12 and 0.13, respectively, were the same or lower than the tan delta physical properties of 0.15 and 0.13, respectively, for Control rubber Samples E and F. This is an indication that the inclusion of the specialized styrene/butadiene rubber with their molecular weight profiles in the rubber Samples G and H tended to beneficially reduce their indicated hysteresis to thereby reduce the predictive internal heat generation within the rubber compositions, and associated rubber temperature increase of such rubber composition when used as a rubber composition for a tire component such as, for example, a tire tread during the operational service of the tire to thereby increase the durability of the tire as well as a beneficial predictive reduction in the tire's predictive rolling resistance and associated decrease in an associated vehicle's fuel consumption.

It is also seen for cured Experimental rubber Samples G and H containing the specialized styrene/butadiene rubbers with their molecular weight profiles, their hot rebound physical properties of 70 and 69 percent, respectively, were higher than corresponding hot rebound values of 63 and 68, respectively, for Control rubber Samples E and F. This is an indication that the inclusion of the specialized styrene/butadiene rubbers with their molecular weight profiles in the rubber Samples G and H beneficially reduced their indicated hysteresis to thereby reduce the predictive internal heat generation within the rubber compositions, and associated rubber temperature increase of such rubber composition when used as a rubber composition for a tire component such as, for example, a tire tread during the operational service of the tire to thereby increase the durability of the tire as well as a beneficial predictive reduction in the tire's predictive rolling resistance and associated decrease in an associated vehicle's fuel consumption.

While the discovered results are not entirely understood, it is envisioned that the reduction in the lower molecular weight contents of the styrene/butadiene elastomers increased the content of the higher molecular weight molecules of their elastomer profiles so that their polymer chain entanglements within the elastomers becomes a greater factor and promotes a greater energy absorption and therefore a beneficial reduction in internal heat generation within the rubber compositions during their dynamic flexing resulting in lower tan delta values and higher hot rebound values of the cured rubber compositions with an associated beneficial reduction in indicated hysteresis of the rubber compositions.

While certain representative embodiments and details have been shown for the purpose of illustrating the invention, it will be apparent to those skilled in this art that various changes and modifications may be made therein without departing from the spirit or scope of the invention.

What is claimed is:

1. A pneumatic rubber tire having a component of a rubber composition containing, based on parts by weight per 100 parts by weight of the rubber (phr), (A) conjugated diene-based elastomers comprised of:
  (1) about 40 to about 90 phr of a specialized styrene/butadiene elastomer having a molecular weight profile comprised of a weight average molecular weight (Mw) in a range of from about 500,000 to about 800,000 with a low molecular weight content limited to a maximum of six percent of said styrene/butadiene elastomer having a number average molecular weight (Mw) of up to 150,000, and
  (2) about 60 to about 10 phr of at least one additional conjugated diene-based elastomer,
(B) about 40 to about 150 phr of reinforcing filler comprised of a combination of rubber reinforcing carbon black and precipitated silica together with a coupling agent having a moiety reactive or interactive with hydroxyl groups on said precipitated silica and another different moiety reactive or interactive with said diene-based elastomers.

2. The tire of claim 1 wherein said coupling agent is comprised of an alkoxyorganomercaptosilane or a bis(3-triethoxysilylpropyl) polysulfide having an average of from about 2 to about 4 connecting sulfur atoms in its polysulfidic bridge.

3. The tire of claim 2 wherein said bis(3-triethioxysilylpropyl) polysulfide has an average of from about 2 to about 2.6 or about 3.4 to about 3.8, connecting sulfur atoms in its polysulfidic bridge.

4. The tire of claim 1 wherein said precipitated silica and coupling agent are provided as a composite of said precipitated silica pre-treated (pre-hydrophobated) with said coupling agent prior to addition thereof to the rubber composition.

5. The tire of claim 4 wherein said coupling agent is comprised an alkoxyorganomercaptosilane.

6. The tire of claim 1 wherein said precipitated silica and coupling agent are provided with said rubber composition to provide an in situ treated precipitated silica within said rubber composition.

7. The tire of claim 6 wherein said coupling agent is comprised of bis (3-triethoxysilylpropyl) polysulfide having an average in a range of from about 2 to about 4 connecting sulfur atoms in its polysulfidic bridge.

8. The tire of claim 1 wherein said specialized styrene/butadiene elastomer has a heterogeneity index (Mw/Mn) in a range of from about 1.5/1 to about 1.8/1.

9. The tire of claim 1 wherein said rubber composition is sulfur cured.

10. The tire of claim 1 wherein said tire component is a circumferential tire tread.

11. The tire of claim 1 wherein said additional conjugated diene-based elastomer is comprised of a polymer of at least one of isoprene and 1,3-butadiene and of styrene and at least one of isoprene and 1,3-butadiene.

12. The tire of claim 1 wherein said additional conjugated diene based elastomer is at least one of cis 1,4-polybutadiene, cis 1,4-polyisoprene and styrene/butadiene elastomers other than said specialized styrene/butadiene elastomer having said molecular weight profile.

13. The tire of claim 1 wherein said specialized styrene/butadiene elastomer is tin or silicon coupled.

14. The tire of claim 12 wherein said additional styrene/butadiene elastomer is tin or silicon coupled.

15. The tire of claim 1 wherein said specialized styrene/butadiene elastomer has a bound styrene content in a range of from about 10 to about 40 percent and a vinyl 1,2-content in a range of from about 10 to about 60 percent.

16. The tire of claim 1 where said specialized styrene/butadiene elastomer has a molecular weight profile comprised of a weight average molecular weight (Mw) in a range of from about 500,000 to about 800,000 with a low molecular weight content limited to a maximum of six percent of said styrene/butadiene elastomer having a weight average molecular weight (Mw) of up to 150,000, and
  wherein said specialized styrene/butadiene elastomer is an organic solvent solution polymerization prepared styrene/butadiene elastomer.

17. The tire of claim 16 where said low molecular weight content of said specialized styrene/butadiene elastomers is a maximum of about 5.5 percent thereof having a weight average molecular weight (Mw) of up to 150,000.

* * * * *